United States Patent [19]

Breit

[11] 4,051,810
[45] Oct. 4, 1977

[54] APPARATUS UTILIZING DEEP OCEAN NUTRIENTS

[76] Inventor: Paul Breit, 910 10th St., Santa Monica, Calif. 90403

[21] Appl. No.: 632,512

[22] Filed: Nov. 17, 1975

[51] Int. Cl.$^2$ .............................................. A01K 61/00
[52] U.S. Cl. ........................................ 119/3; 61/1 R; 119/5; 261/25
[58] Field of Search ............... 9/8 R; 61/1 R; 417/61, 417/108; 210/169, 197, 221; 239/182; 261/25, 77, 91, 120, 121, 123; 259/96; 119/5, 2, 3, 4; 47/1.2, 1.4; 37/61

[56] References Cited

U.S. PATENT DOCUMENTS

| 2,827,268 | 3/1958 | Staaf | 61/1 R |
|---|---|---|---|
| 3,007,430 | 11/1961 | Breneman | 114/183 A |
| 3,148,509 | 9/1964 | Laurie | 61/1 R |
| 3,193,260 | 7/1965 | Lamb | 9/8 R |
| 3,320,928 | 5/1967 | Smith | 61/1 R |
| 3,683,627 | 8/1972 | Girden | 61/1 R |
| 3,758,083 | 9/1973 | Palmer | 261/25 |

FOREIGN PATENT DOCUMENTS 1,149,377   12/1957   France ................................... 261/77

OTHER PUBLICATIONS

Rougeron, Camille "Changing Our Climate;" The Detroit News, Dec. 19, 1957.

*Primary Examiner*—Trygve M. Blix
*Assistant Examiner*—Jesus D. Sotelo

[57] ABSTRACT

Apparatus for the farming of the vast ocean areas by transferring, in mass and into select areas, the nutrient rich abyssal waters throughout the photic zone where penetration of sunlight supports the life processes whereby sea life flourishes and provides a high yield for fishery harvesting. Apparatus is provided for the subtle and continued imparting of vertical momentum to abyssal waters which flood into the photic zone as nutrient rich replacement waters. The replacement nutrient rich water feeds the food chain which produces the protein that can be developed by propagation as circumstances require.

9 Claims, 4 Drawing Figures

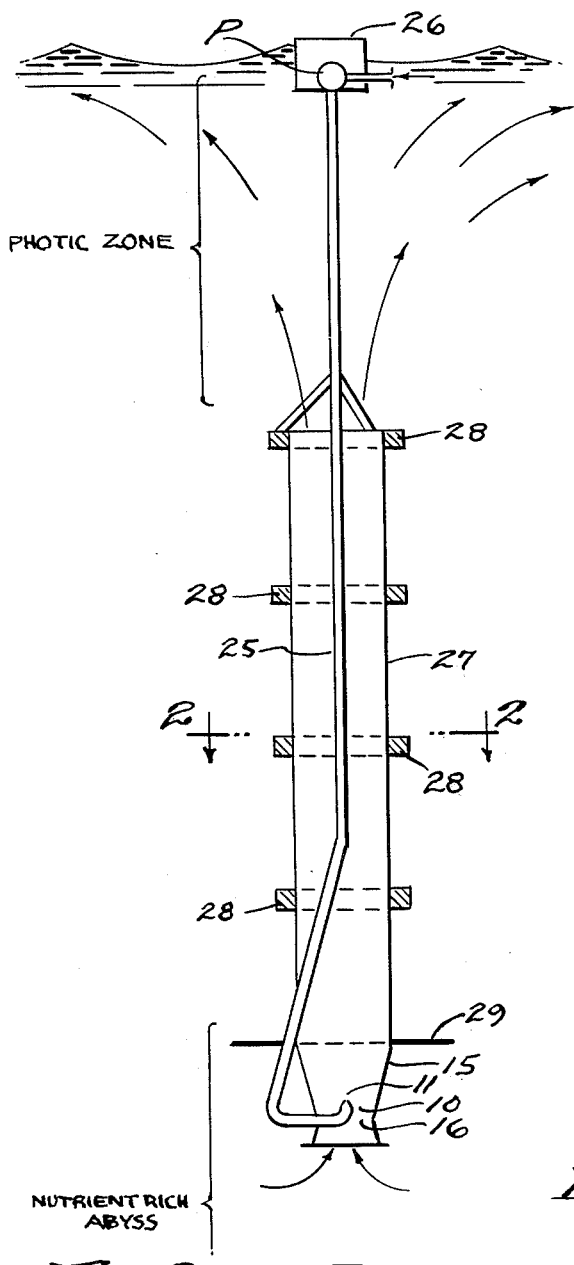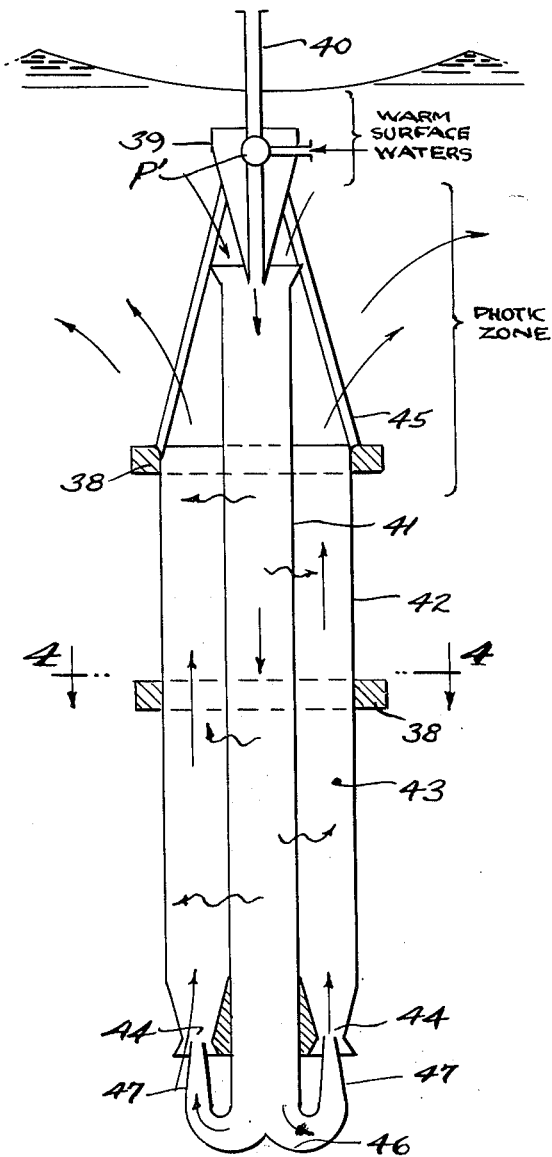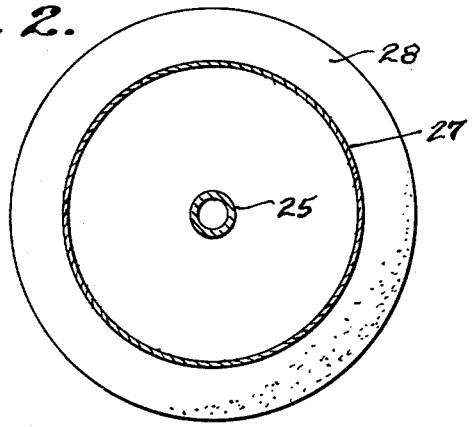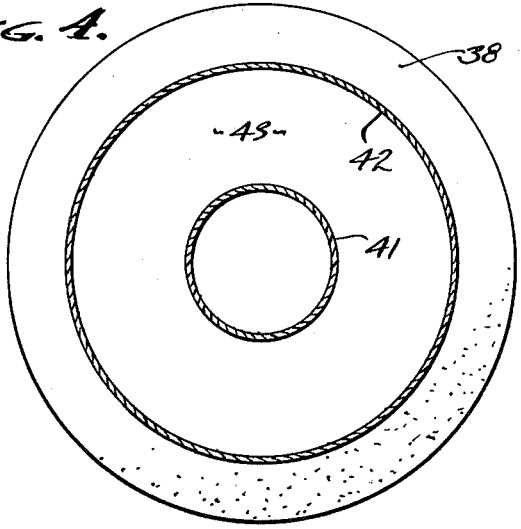

APPARATUS UTILIZING DEEP OCEAN NUTRIENTS

BACKGROUND

It is generally known that nutrient rich waters lie in the ocean depths below the photic zone while great areas of the oceans are essentially marine deserts lacking in sea life. Thus, the nutrient potential is present but the nutrient rich cold water that lies well below the photic zone depth is normally unavailable to the sea life which thrives upon the effect of sunlight. The photic zone is that layer of water which extends to an approximate depth of several hundred feet and within which there is sufficient sunlight to support sea life processes. The nutrient rich zone is that body of water which lies from 500-1200 feet and below and within which there is contained the nutrient substances, both organic and inorganic, for the growth of sea life. It is known that certain ocean currents, such as the Peru current encountering the West Coast of South America, have a transferring effect by which nutrient rich waters from the depths of the oceans are raised into the photic zone and with the result that sea life flourishes there. It is also known that the intense sunlight of the tropics is conducive to prolific sea life, and that this effect is retarded by nutrient depletion of those photic zone waters. Generally, the cold and frigid oceans of the world are abundant in sea life such as planktonic krill, and the like, so necessary to the food chain from which the yield of marine protein is derived. Therefore, it is a general object of this invention to develop the potentially fruitful growth areas of the oceans which are naturally lacking in nutrient within the photic zone depths, by transferring nutrient rich waters from the colder depths having known high nutrient values.

Fertility of the marine environment is increased when nutrient rich waters are available, and it is known that there is a vast supply of these nutrient rich waters at submarine levels of approximately 1200 feet and deeper, as evidenced by samples taken from the various depths and from trenches of the oceans. However, the normal tides and currents are surface oriented and move horizontally or circumferentially over the earth, with but few geological inducements to create vertical currents that transfer waters from the depths. Thermal convection has little or no effect on displacement of the photic zone waters by abyssal waters, and vertical mass movement of waters as a result of sunlight and radiant heat is negligible. However, natural forces are available to cause the transfer of abyssal waters toward the surface of the oceans, and it is to this end that it is an object of this invention to provide an apparatus to harness natural phenomenon to the work of transferring abyssal waters upwardly and thereby replace the waters of the photic zone.

There are areas of the oceans which are characterized by vast photic zones, underlying which there are far more vast, by volume, abyssal and nutrient rich waters. It has been calculated that 72% of the earth's surface is covered by water and that the average depth of the oceans is five times greater than the average height of the lands which is only about 760m. (2500 feet). Therefore, the nutrient potential of abyssal waters is tremendous and heretofore unavailable to the growth of sea life, it being an object of this invention to utilize these nutrient rich waters in marine farms which comprise select areas of the oceans otherwise lacking in sea life due to the absence of sufficient nutrients in the photic zones that naturally support the life processes.

The tides and currents as caused by gravitational and wind effects are not sufficient in themselves to cause the required mass displacement and transfer of abyssal waters into the photic zone, there being vast unbounded areas of ocean presently unproductive and adapted to be farmed. It is an object therefore, to provide means whereby the cold abyssal nutrient rich waters are transferred in mass by induced currents therein which rise upwardly to replace waters of the photic zone. The transfer is subtle and continuous, utilizing hydraulics to actuate lift means imparting vertical momentum to the abyssal waters and forcing them to rise and thereby flood in omni directions into the photic zone where sea life is promoted thereby with the penetration of sunlight. In practice, the pressured flow of supplement waters is contemplated to actuate the lift means; supplement waters being available from adjoining land masses as outfall, processed and/or unprocessed. Supplemental waters are available from inland reservoirs under a head of pressure to be used directly, or as effluent from processing plants, and introduced by said lift means at a higher temperature than said abyssal waters and/or aerated, and all of which is conducive to imparting vertical momentum through any one or all of the phenomenon of velocity, heat convection and displacement.

It is an object to provide apparatus for carrying out the nutrient water transfer hereinabove described, and specifically the provision of lift means by which nutrient rich abyssal waters rise to replace the waters previously occupying the overlying photic zone. The energy employed is naturally available by wave-wind motion employed to implement hydraulic means to lift said abyssal waters.

DRAWINGS

The various objects and features of this invention will be fully understood from the following detailed description of the typical preferred form and application thereof, throughout which description reference is made to the accompanying drawings, in which:

FIG. 1 is a cross sectional elevation of a first embodiment of the apparatus.

FIG. 2 is an enlarged transverse sectional view taken as indicated by line 2—2 on FIG. 1.

FIG. 3 is a cross sectional elevation of a second embodiment of the apparatus, and FIG. 4 is an enlarged transverse sectional view taken as indicated by line 4—4 on FIG. 3.

PREFERRED EMBODIMENT

This invention involves marine farming with abyssal waters that are transferred into the photic zone where sea life processes are supported by the penetration of sunlight. Select but vast areas are treated and the transfer of waters is necessarily slow by means of the subtle and continuous lifting of abyssal waters which flood into the photic zone replacing the nutrient poor, or depleted, waters therefrom. The selected areas of treatment can be shore-line oriented or mid-ocean, the former stationary and the latter anchored or adrift as circumstances require. The ocean depth determines the anchorage feasibility; and the ocean currents (some of which circulate within an ocean) determine the feasibility of drifting free. In practice, the apparatus is operable where there is nutrient rich abyssal waters underlying or immediate to the photic zone waters that are to be replaced. Thus, the nutrient richness required as a practical matter will necesitate drawing from the abyssal waters at a depth of 500–1200 feet, and all of which determines the anchorage feasibility.

Referring to the operation of this apparatus, the environment for a productive harvesting of sea life is provided by establishing nutrient strengthened photic zones of the oceans, so that animal husbandry of sea life can be practiced in and said zones planted with spawn of the species to be harvested for their protein. It is contemplated that the food chain will be established by the introduction of inoculums and/or plantings of the various organisms and animal species in timed sequence as may be required, dispersed into the photic zone waters as they are enriched. Therefore, it is the select photic zone areas with which this invention is concerned; these areas being subjected to the method which involves generally the transfer of sub-marine waters from nutrient richer zones into nutrient poorer zones to flood the latter with waters of the former. The photic zone surface waters and nutrient rich submarine waters are comingled and dispersed one within the other and the nutrient poor waters replaced by the introduction of the nutrient rich waters which fan out in omni directions. A feature of this invention is the location of or focal point of operation where vertical lift of submarine waters displace the surface photic zone waters which flow away from the lift operation in a solution which diminishes in concentration as it disperses. Thus, a concentration of nutrient rich waters occurs at the hub or source of the lift operation.

The lift operation of this method is accomplished by one or more applied forces, namely imparting vertical momentum by means of the velocity effect of applied hydraulics, and by means of the convection effect of applied heat differential. The velocity effect of hydraulics is embodied in the step of directing supplement waters vertically upward from the nutrient rich zone, said supplement waters being projected within the nutrient rich zone below its upper extremity. The convection effect of heat rise is embodied in the step of introducing supplement waters of higher temperatures than the surrounding ambient temperature. The aforementioned effects each has a pumping action adapted to lift vertically the waters into which the nutrient rich water is to be introduced or directed. Further, the supplemental waters are to be obtained from the overlying or adjoining photic zone or body of water existing between said photic zone and the abyssal depths, and circulated as thus far described by the step of pumping the same and discharged to gain any one or a combination of the aforesaid effects. As a consequence of this drawing of abyssal waters from submarine levels and dispersing the same to surface levels of the photic zone, a nutrified condition of ocean areas is achieved and made conducive to the propagation of abundant sea life.

Referring now to the apparatus, lift means is provided by which abyssal waters are raised from the ocean depths beneath the photic zone which is to be enriched thereby. The lift means is adapted to raise submarine waters by imparting vertical momentum to the same and will vary according to the two embodiments as illustrated throughout the accompanying drawings. In its broad form, the lift means is a hydraulic pump that causes the surrounding waters to rise and flow from a lower level into a higher level. Although mechanical means such as propellers and the like have been proposed, their complexity and the transmission of operating energy thereto is overruling in favor of the apparatus shown which comprises hydraulic jets or siphons that pump water vertically. A jet 10 is disposed on a vertical axis and from which supplement waters are emitted, preferably from a restricted spout or nozzle 11, thereby entraining the surrounding waters in an annulus 16 within the shroud 15 in which the jet 10 is immersed, as shown in FIGS. 2, 3 and 4. It will be observed that the jet 10 is placed at or within the nutrient rich zone, and that the current of up-flowing nutrient rich waters disperses into the overlying waters. Continued operation of the jet 10 establishes a current having momentum which carries into the all important surface layer of the ocean referred to herein as the photic zone, where the comingled waters spread out in omni directions as depicted in FIGS. 1 and 3.

Referring now to FIGS. 1 and 2 of the drawings, a drifting embodiment of the apparatus is shown floating at a pre-determined depth below the photic zone. As shown, the lift means is held at a selected depth by a tubular column 25 that transports supplement waters thereto drawn from the photic zone immediately below the surface. A wave motion pump means P is carried by a vessel 26 that floats at the surface with its vertical motion impeded by the depending column 25 and its apendages that will now be described. The shroud 15 is extended upwardly by a tubular wall 27 of pliant sheet material supported by attached vertically spaced buoyant ribs 28 surrounding or projecting outwardly from said wall. The ribs 28 maintain the cross sectional configuration of the wall 27, and each rib is sufficient to support the immediately depending section of the wall, said sections continuing one into the other for continuity of the two. The lowermost suction end of the shroud 15 is exposed to nutrient rich waters and the uppermost discharge end of the tubular wall 27 is at or within the photic zone. A horizontal baffle 29 provides the aforementioned impedance to the vessel 26, whereby the pump means P is made effective in response to the vertical component movement of wave motion.

Referring now to the embodiment of FIGS. 3 and 4 of the drawings, a floating submerged apparatus identified by a projecting tower 40 is provided having a tubular member 41 depending from a surface oriented vessel 39 and at least its lowermost end surrounded by a shroud 42 with an annulus 43 established therebetween. In this form of the apparatus advantage is taken of thermo dynamics wherein the warmer high salinity surface waters are induced to drop by virtue of their heavier gravity and to transfer heat energy to the surrounding abyssal waters of higher nutrient value, to cause the latter to rise. Additionally, the momentum of the descending surface waters is conserved and/or re-directed by jets 44, preferably shrouded jets, to impart vertical momentum to abyssal waters to cause an ascending current therein. As shown, the vessel 39 carries a wave motion activated pump P' that projects a downwardly disposed stream of solar heated surface waters into the tube member 41 which extends well into the abyssal waters to be raised, said surface waters being conditioned for descent within the confines of the walled member 41. In accordance with this invention, the wall of member 41 is heat conductive and readily transfers the heat of surface waters to the rising abyssal waters, the heat of the latter never exceeding that of the former, but so that the heat of the latter abyssal waters becomes greater than that of the surrounding waters. Shroud 42 is suspended from tubular member 41 by spreaders 45, there being vertically spaced floatation ribs 38 surrounding the shroud to maintain its cross section and to afford impedance and stability against vertical motion. Although the surface waters can be expended into the abyssal depths, it is preferred that the momentum thereof be conserved and re-directed vertically through the jets 44; and to this end a re-curved bottom 46 returns the surface waters into ducts 47 and into the lowermost open end of the shroud 42 which is restrictively shaped to maximize an upward siphoning action. Thus, the wave motion at the ocean surface activates the pump to impart downward momentum into the surface waters which are drawn thereby into the open upper end of the tubular member disposed to extend into the abyssal depths, the heat from the descending warmer surface waters being transferred into the surrounding rising waters which have acquired vertical momentum from the re-directed surface waters acting intimately therewith through the lowermost jets.

Having described only typical preferred forms and applications of my invention, I do not wish to be limited or restricted to the specific details herein set forth, but wish to reserve to myself any modifications or variations that may appear to those skilled in the art:

I claim:

1. A floating apparatus for establishing a nutrient strengthened photic zone in a surrounding area of the ocean and including; a vessel adapted to float at the ocean surface, a member depending from the vessel and its lower end extending into the underlying nutrient rich waters, lift means comprised of a hydraulic pump immersed in and with an inlet to receive the supplement surface waters and a jet supplied with said supplement surface waters and carried by the lower end of the member with an outlet immersed in and disposed to discharge upwardly imparting vertical momentum to the underlying nutrient rich waters and thereby transferring the same into the overlying photic zone waters to enrich the latter with the former.

2. The floating apparatus for nutrient enrichment of an ocean area as set forth in claim 1 wherein a tubular shroud of flexible material is disposed in vertical alignment over the lift means and is supported by a float, said shroud extending to the photic zone and confining the transfer of nutrient rich waters lifted therein.

3. The floating apparatus for nutrient enrichment of an ocean area as set forth in claim 1 wherein a tubular shroud of flexible material is disposed in vertical alignment over the lift means and is supported by vertically spaced floats, said shroud extending to the photic zone and confining the transfer of nutrient rich waters lifted therein.

4. The floating apparatus for nutrient enrichment of an ocean area as set forth in claim 1 wherein a tubular shroud of flexible material is disposed in a vertical alignment over the lift means and is supported by at least one surrounding ring-shaped float, said shroud extending to the photic zone confining the transfer of nutrient rich waters lifted therein.

5. The floating apparatus for nutrient enrichment of an ocean area as set forth in claim 1 wherein the said member is tubular, and wherein the lift means jet is surrounded by a shroud defining an annulus around said member extending vertically as a tube of flexible material open to discharge into the photic zone waters and being supported by a float.

6. The floated apparatus for nutrient enrichment of an ocean area as set forth in claim 1 wherein the said member is tubular, and wherein the lift means jet is surrounded by a shroud defining an annulus around said member extending vertically as a tube of flexible material open to discharge into the photic zone waters and being supported by vertically spaced floats.

7. The floating apparatus for nutrient enrichment of an ocean area as set forth in claim 1 wherein the said member is tubular, and wherein the lift means jet is surrounded by a shroud defining an annulus around said member extending vertically as a tube of flexible material open to discharge into the photic zone waters and being supported by at least one surrounding ring-shaped float.

8. A floating apparatus for establishing a nutrient strengthened photic zone in a surrounding area of the ocean and including; a vessel adapted to float at the ocean surface, a wave activated pump means carried by said vessel, a tubular member depending from the vessel and its lower end extending into the underlying nutrient rich waters, lift means supplied by supplement surface water forced through said tubular member by said pump means and carried by the lower end of the member and immersed in and imparting vertical momentum to the underlying nutrient rich waters and thereby transferring the same into the overlying photic zone waters to enrich the latter with the former.

9. The floating apparatus for nutrient enrichment of an ocean area as set forth in claim 8 wherein the wave activated pump means draws the supplement water from the photic zone waters to be forced to said lift means through said tubular member.

* * * * *